United States Patent [19]
Fletcher et al.

[11] Patent Number: 5,878,656
[45] Date of Patent: Mar. 9, 1999

[54] INTERCHANGEABLE ROASTING PAN/COVER

[75] Inventors: Carl R. Fletcher, Kildeer; Norton Sarnoff, Northbrook, both of Ill.

[73] Assignee: Handi-Foil Corporation, Wheeling, Ill.

[21] Appl. No.: 4,365

[22] Filed: Jan. 8, 1998

[51] Int. Cl.⁶ .............................. A47J 27/00; A47J 37/00; A47J 37/10; B65D 90/00
[52] U.S. Cl. .................................. 99/340; 99/400; 99/426; 99/446; 99/449; 220/669; 220/912; D7/354; D7/359
[58] Field of Search .............................. 99/339, 340, 400, 99/401, 422–426, 444–450; 126/390, 369, 373; 220/604, 608, 669, 574, 675, 4.21, 4.24, 4.25, 912; 229/3.5 MF, 406; D7/354, 359; D9/424, 428

[56] References Cited

U.S. PATENT DOCUMENTS

| | | |
|---|---|---|
| D. 26,933 | 4/1897 | Mullins . |
| D. 26,934 | 4/1897 | Mullins . |
| D. 26,935 | 4/1897 | Mullins . |
| D. 165,610 | 1/1952 | Sandberg . |
| D. 207,679 | 5/1967 | Kennedy . |
| D. 211,272 | 6/1968 | Stageberg . |
| D. 234,488 | 3/1975 | Wiebe . |
| D. 255,309 | 6/1980 | Colato et al. . |
| D. 267,221 | 12/1982 | Williams . |
| D. 269,249 | 6/1983 | Cillario . |
| D. 269,323 | 6/1983 | Cillario . |
| D. 280,605 | 9/1985 | Karlik . |
| D. 287,809 | 1/1987 | Alexander . |
| D. 292,887 | 11/1987 | Schouten . |
| D. 298,199 | 10/1988 | Finsilver et al. . |
| D. 301,819 | 6/1989 | Watson et al. . |
| D. 306,974 | 4/1990 | Tholstrup . |
| 313,092 | 3/1885 | Mayes . |
| D. 321,809 | 11/1991 | Zobrist . |
| D. 323,616 | 2/1992 | Mueller . |
| D. 344,658 | 3/1994 | Arkoosh, Jr. et al. . |
| D. 350,669 | 9/1994 | Conti . |
| D. 373,284 | 9/1996 | Hirst . |
| D. 373,954 | 9/1996 | Wolff . |
| D. 375,652 | 11/1996 | Hayes . |
| D. 382,795 | 8/1997 | Abayhan . |
| 642,507 | 1/1900 | Topping . |
| 1,683,603 | 9/1928 | Canfield . |
| 2,289,037 | 7/1942 | Poglein . |
| 2,673,003 | 3/1954 | Stewart . |
| 2,704,974 | 3/1955 | Setmen ...................................... 99/422 |
| 2,722,173 | 11/1955 | Cunningham ............................. 99/428 |
| 3,326,408 | 6/1967 | Ringlen . |
| 3,659,585 | 5/1972 | Bay . |
| 3,958,504 | 5/1976 | Levin . |
| 4,216,763 | 8/1980 | Miklas . |
| 4,616,762 | 10/1986 | Alexander . |
| 4,883,195 | 11/1989 | Ott et al. ............................. 229/406 X |
| 4,974,738 | 12/1990 | Kidd et al. . |
| 5,026,958 | 6/1991 | Palacios . |
| 5,628,427 | 5/1997 | Hayes . |
| 5,666,875 | 9/1997 | Wener . |

*Primary Examiner*—Timothy F. Simone

[57] ABSTRACT

A disposable and interchangeable roasting pan/cover features a base panel with a side wall about its perimeter. A platform for supporting a food product is positioned on the interior surface of the base panel. A handle recess may form the platform so as to define a handle upon the exterior surface of the base panel. Alternatively, a pair of side wall recesses in the interior surface of the side wall may define handles on the side wall exterior surface while enhancing the structural strength of the pan/cover. A rim is disposed about the outer edge of the side wall and features an even number of staggered tongue and groove features. Two of the pan/covers may be oriented with their rims abutted so that one pan/cover serves as a cover for the other serving as a pan. The tongue and groove features of the two pan/covers engage one another so that the cover oriented pan/cover does not slide off of the pan oriented pan/cover holding the food product.

18 Claims, 4 Drawing Sheets

INTERCHANGEABLE ROASTING PAN/COVER

BACKGROUND OF THE INVENTION

1. Field of the Invention

Disposable roasting pans for use in cooking foods such as hams, roasts, turkeys, and the like have become popular because they are inexpensive to purchase and eliminate the need for roasting pan cleanup. These roasting pans are typically made of a light or thin gauge material, such as aluminum foil, and may be used with a lid or cover made of the same material.

While the pan is typically used for cooking only one time, the cover, since it does not receive the juices or grease from the food item, could be readily reused. With existing disposable pan and cover designs, however, the cover may not be effectively used as a pan. As a result, the cover by itself is not useful, and consumers may be forced to purchase both another cover and pan when only the latter is actually needed. In other words, consumers can end up discarding and thus wasting the covers of existing disposable roasting pan and cover sets.

If the cover could be used as a pan, that is, if the pan and cover of the roasting pan were interchangeable, the consumer would need to only purchase another single pan/cover for future use. Alternatively, the consumer could use the leftover cover by itself as a pan if his or her cooking needs so permitted. Consumers could also purchase two pan/covers and have the option of using them together in a pan and cover configuration or as two pan applications (where covers are not required). A disposable roasting pan with an interchangeable cover would thus be advantageous in terms of expense and flexibility.

2. Description of Related Art

A roasting pan featuring an interchangeable cover is disclosed in U.S. Pat. No. 5,666,875 to Wener. The roasting pan of Wener has two identical pan halves. Each pan half features a rim with staggered protrusions and recesses. When two halves are joined in a pan and cover configuration, the protrusions and recesses of the two halves fit together so that the halves do not shift relative to each other. In addition, a pair of extending and rigid handles are rim-mounted at opposing ends of each pan half. While the roasting pan of Wener offers the advantages of an interchangeable pan and cover, it also suffers from a number of disadvantages, especially when utilized in a disposable roasting pan application.

As a food product such as turkey, ham, or beef is roasted, juices and grease will collect in the bottom of the roasting pan. It is therefore desirable to elevate the food product above the bottom of the roasting pan so that these juices and grease will not be absorbed in the cooking item and disrupt an even cooking process. In addition, elevation allows for drainage and thus for the food product to be more uniformly cooked and browned. The roasting pan of Wener does not provide a platform for elevating a food product above its bottom. Its interior bottom surface is flat. While a wire rack could be placed within the roasting pan, and the food product placed upon the rack, this would involve additional expense and cleanup for the user.

The thin gauge metals used by disposable roasting pans suffer from diminished structural strength. As a result, disposable roasting pans customarily feature ribs of varying sizes and designs in the bottom of the pan to add structural strength without increasing the metal gauge or thickness. The roasting pan of Wener does not provide for such ribs or the like. It follows that if the roasting pan of Wener were made of a disposable-grade material, it would have a very flimsy and weak bottom surface. This would severely limit the size of the food product that could be accommodated by the roasting pan.

The extending and rigid handle design of the roasting pan of Wener suffers from a number of disadvantages. Even though the handles may be incorporated into the one-piece construction of the pan halves, they clearly involve additional manufacturing operations such as cutting and smoothing (of their edges). These manufacturing operations add cost to the product.

SUMMARY OF THE INVENTION

Accordingly, it is an object of the present invention to provide an interchangeable roasting pan/cover that is disposable.

It is another object of the present invention to provide an interchangeable roasting pan/cover that provides an elevated platform for food products.

It is still another object of the present invention to provide an interchangeable roasting pan/cover that features enhanced structural strength.

It is still another object of the present invention to provide an interchangeable roasting pan/cover that is economical to manufacture.

The present invention is directed to an interchangeable roasting pan/cover that is made of a single sheet of a disposable material (such as aluminum foil). The pan/cover features a base panel with interior and exterior surfaces. A number of platforms are formed upon the interior surface of the base panel so that a food product, such as a turkey, ham, or roast, may be supported. Between the platforms are recesses or pools that receive grease and juices from the food product. As a result, the platforms support the food product so that it is elevated above the grease and juices in the recesses. The platforms also allow the food product to be more evenly cooked and browned and provide the base panel with increased structural strength. In some embodiments of the invention, at least one of the platforms is formed by a handle recess that defines a handle on the exterior surface of the base panel.

The perimeter of the pan/cover base panel is surrounded by a side wall. The side wall has interior and exterior surfaces and a rim surrounding its outer edge. In some embodiments of the invention, a pair of side wall recesses are formed in the interior surfaces of opposing portions of the side wall so as to define a pair of handles on the side wall's exterior surface. A circumferential channel may be included at the junction of the side wall and the perimeter of the base panel. The structural strength of the pan/cover is greatly enhanced when the side wall recesses extend between this circumferential channel and the rim of the pan/cover.

An even number of tongue and groove features may be formed upon the rim of the pan/cover of the present invention in a staggered fashion. Accordingly, a pair of the pan/covers may be oriented with their rims abutted so that one pan/cover serves as a cover for the other serving as a pan. In this configuration, the tongue and grooves of the two pan/covers engage so that the cover oriented member does not slide off of the pan oriented member containing the food product.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1A:
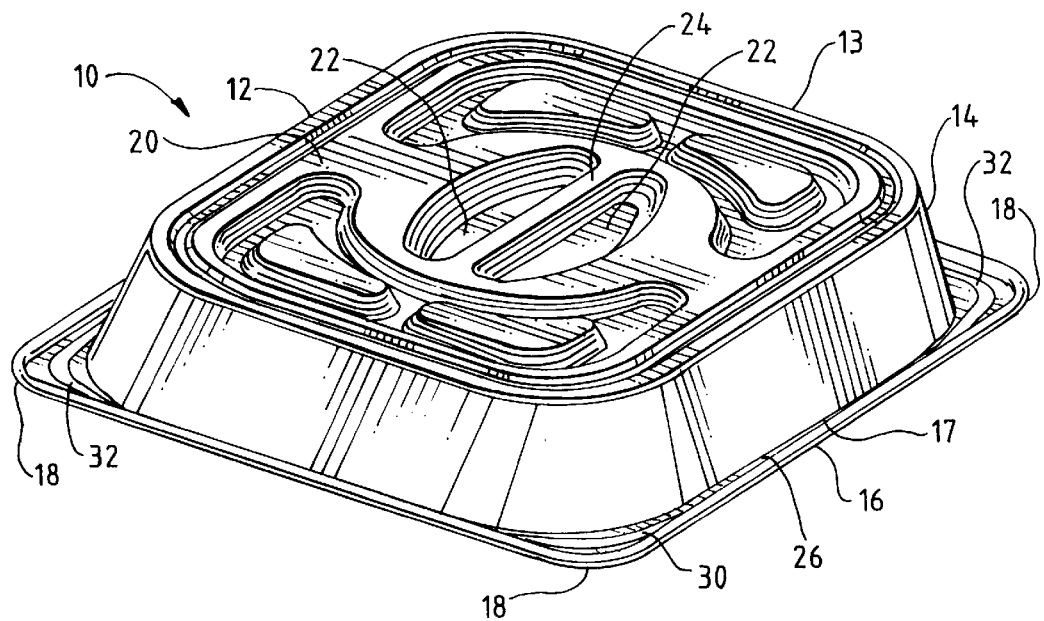
FIGS. 1A and 1B are perspective views of an embodiment of the interchangeable roasting pan/cover of the present invention showing respectively the exterior and interior details thereof.
Figure 1B:
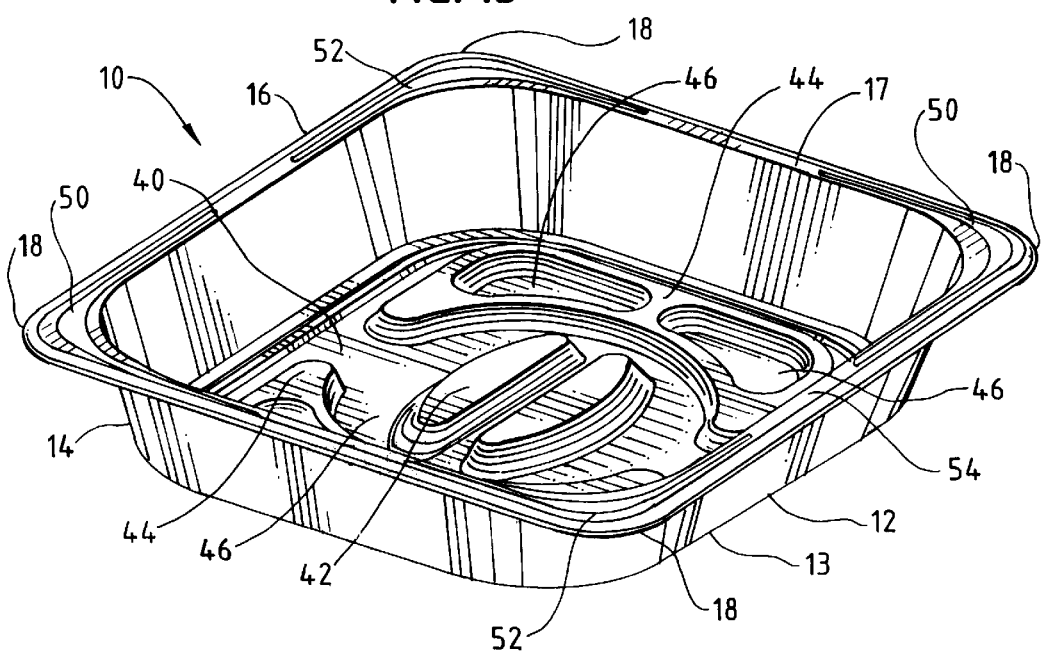

With reference to FIGS. 1A and 1B, an interchangeable roasting pan/cover constructed in accordance with the present invention is indicated generally at 10. The roasting pan/cover 10 is preferably stamped from a single sheet of an inexpensive thin gauge metal such as aluminum foil. In FIG. 1A, roasting pan/cover 10 is oriented so as to be used as a cover. In contrast, FIG. 1B shows roasting pan/cover 10 oriented so as to be used as a pan wherein a food product (not shown) may be placed.

Roasting pan/cover 10 includes a base panel 12 with a continuous and outwardly extending side wall 14 about its perimeter 13. Although base panel 12 is shown to be generally rectangular in FIGS. 1A and 1B, it is to be understood that other shapes, such as a square or an oval, may alternatively be used. A rim, indicated at 16, is disposed about the outer edge 17 of side wall 14 and includes corner portions 18.

As shown in FIG. 1A, base panel 12 features an exterior surface, indicated at 20. A pair of handle recesses 22 define a handle 24 in the central portion of outer surface 20. As a result, roasting pan/cover 10 is balanced if it is gripped by handle 24. This allows roasting pan/cover 10 to be easily lifted and manipulated single-handedly by a cook when it is used as a cover. Handle recesses 22 are preferably sized so that handle 24 may be easily grasped by a cook using an oven mitt or a pot holder.

Positioned upon the exterior surface 26 of rim 16, and centered about the corner portions 18, are staggered or alternating tongue and groove features, indicated at 30 and 32, respectively. As will be explained below, tongue and groove features 30 and 32 serve to prevent roasting pan/cover 10 from shifting when it is being used as a cover.

As shown in FIG. 1B, the interior surface 40 of base panel 12 corresponds to the exterior surface 20 shown in FIG. 1A. In addition to the platforms 42 resulting from handle recesses 22 (FIG. 1A), an opposing pair of additional platforms 44 are formed in interior surface 40. The platforms 42 and 44 define recesses or pools 46 that receive the juices and grease produced by a food product as it is cooked in the pan/cover. In addition, platforms 42 and 44 support the food product so that it is elevated out of the juices and grease. This is desirable as it prevents the food product from absorbing excessive fat. Elevating the food product on platforms 42 and 44 also promotes uniform cooking and browning.

Platforms 42 and 44 are sized so as to be large enough to provide adequate support for the food product (without collapsing) yet are small enough that recesses 46 may receive all of the juice and grease produced by a food product without overflowing. In addition, the sizes of platforms 42 and 44 are minimized so that the food product is more uniformly cooked and browned.

In addition to improving the cooking performance of the pan/cover, the combination of recesses 46 with platforms 42 and 44 increases the structural strength of base panel 12. This is particularly important when roasting pan/cover 10 is used to support a food item (as opposed to being used as a cover).

The design of roasting pan/cover 10 also optimizes the manufacturing operation. More specifically, the single stamping operation performed upon base panel 12 accomplishes three functions simultaneously. First, it provides a handle (item 24 in FIG. 1A). Second, it provides food support platforms and juice and grease recesses (items 42, 44, and 46 in FIG. 1B, respectively). Third, it provides roasting pan/cover 10 with improved structural strength. By optimizing the manufacturing process, roasting pan/cover 10 may be produced very rapidly and economically.

The tongue features 30 of FIG. 1A form the groove features 50 in FIG. 1B on the interior surface 54 of rim 16. Similarly, the groove features 32 of FIG. 1A form the tongue features 52 in FIG. 1B. By staggering the tongue and groove features on rim corner portions 18, a pair of the roasting pan/covers may fit together in two different ways.

In a first "nested" configuration, the two pan/covers may be placed one inside of the other for compactness. In this configuration the tongue and groove features on the rim interior surface (54 in FIG. 1B) of the bottom pan/cover engage corresponding tongue and groove features on the rim exterior surface (26 in FIG. 1A) of the top pan/cover. This configuration allows a number of the pan/covers to be easily transported and stored either in a home or at a store.

Figure 2:
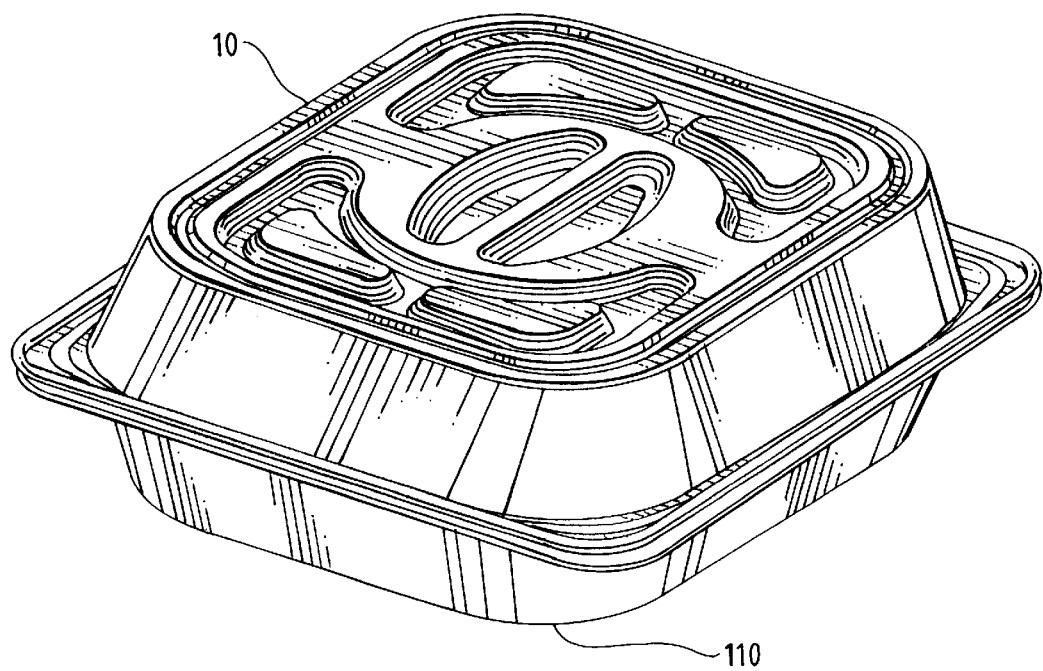
FIG. 2 is a perspective view showing two roasting pan/covers of the type of FIG. 1 joined in a pan and cover configuration.

The second configuration possible for two of the pan/covers is illustrated in FIG. 2. In this configuration, the roasting pan/cover 10 of FIG. 1 is oriented so as to serve as a cover. A second roasting pan/cover, identical in construction to roasting pan/cover 10, is indicated at 110 and is oriented so as to serve as a pan within which a food product is supported. The cooperation of corresponding tongue and groove features on the interior surfaces of the two pan/cover rims (54 in FIG. 1B) prevents the cover oriented pan/cover 10 from shifting relative to the pan oriented pan/cover 110.

While FIGS. 1A, 1B, and 2 show the tongue and groove features centered about rim corner portions 18, it should be understood that alternative positions along rim 16 exist. Alternative sizes and shapes for the tongue and groove features also may be used. Furthermore, while four tongue and groove features are illustrated, an alternative even number of features may be used. For example, the pan/cover could have a single tongue feature and a single groove feature mounted on opposing sides of its rim. Regardless of the number of tongue and groove features used, they must be positioned about the rim of the pan/cover in a staggered fashion so that corresponding tongue and groove features engage when two pan/covers are placed together, whether in a nested configuration or in a cover and pan configuration.

Figure 3A:
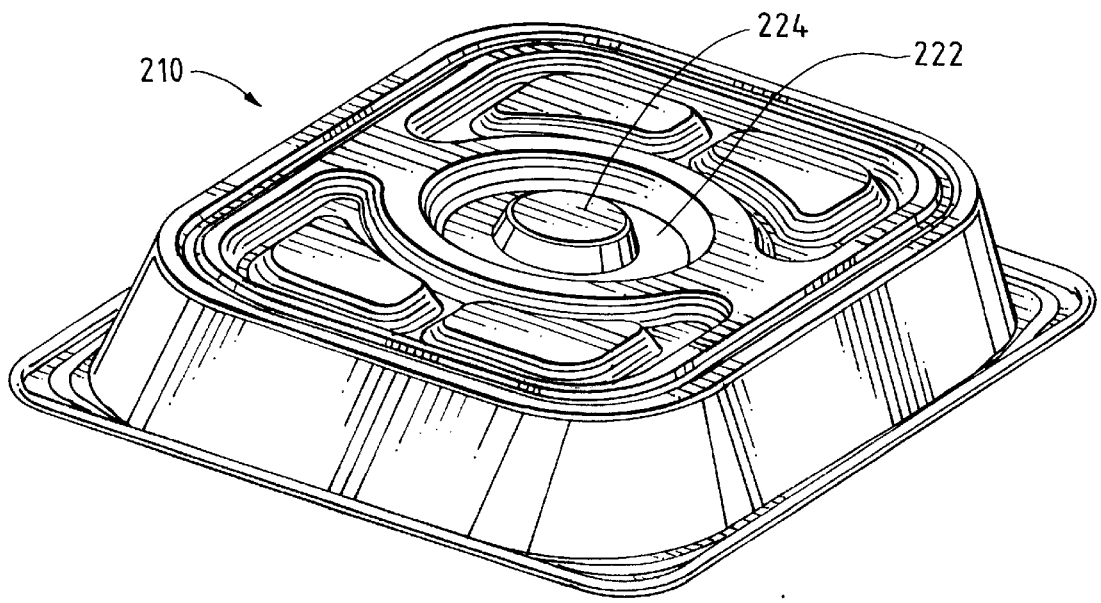
FIGS. 3A and 3B are perspective views of a second embodiment of the interchangeable roasting pan/cover of the present invention showing respectively the exterior and interior details thereof.
Figure 3B:
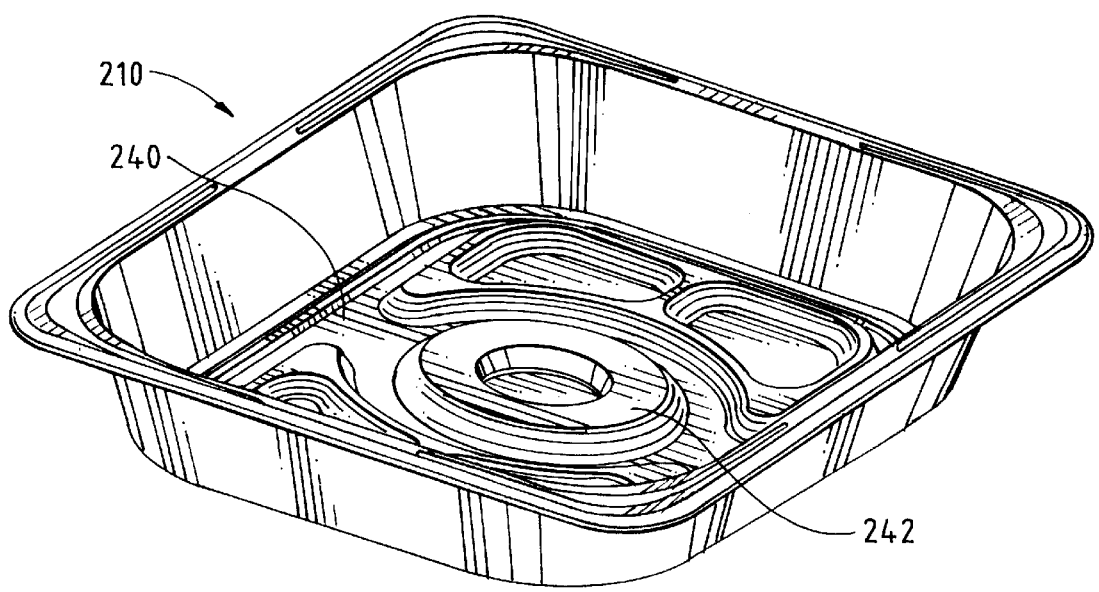

With reference to FIGS. 3A and 3B, a second embodiment of the interchangeable roasting pan/cover of the present invention is indicated generally at 210. As with FIGS. 1A and 1B, FIG. 3A shows the pan/cover oriented as a cover, while FIG. 3B shows the pan/cover oriented as a pan to contain a food product. The only difference between pan/cover 210 and pan/cover 10 of FIGS. 1A and 1B is the configuration of the handle recess 222 and the handle 224. More specifically, pan/cover 210 features only a single annular handle recess 222 which, as a result, defines a circular handle 224. As shown in FIG. 3B, this provides the interior surface 240 of pan/cover 210 with an annular platform 242 upon which a food product may be placed.

Figure 4A:
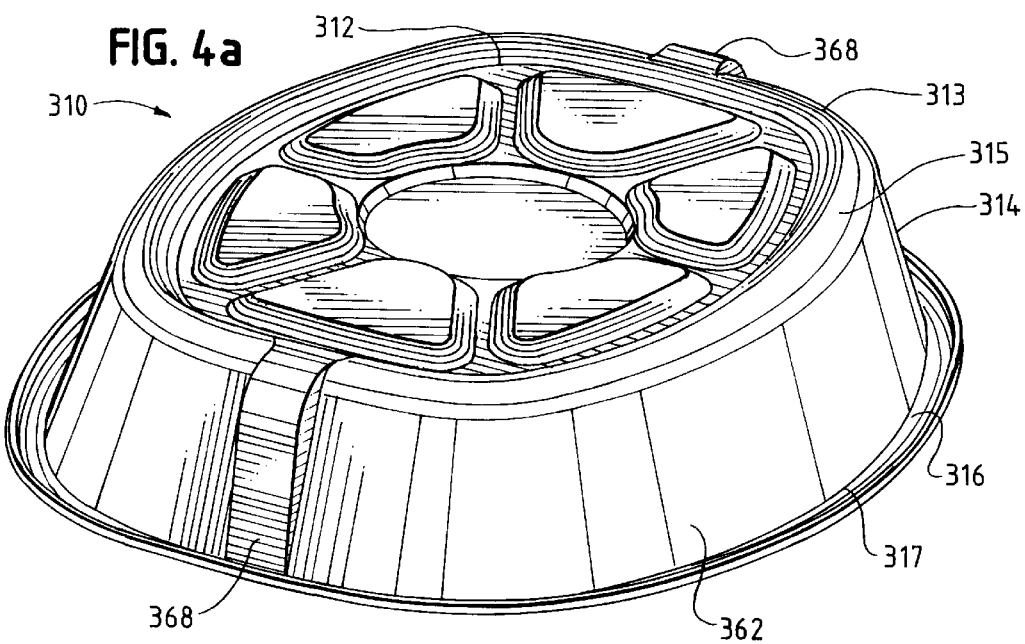
FIGS. 4A and 4B are perspective views of a third embodiment of the interchangeable roasting pan/cover of the present invention showing respectively the exterior and interior details thereof.
Figure 4B:
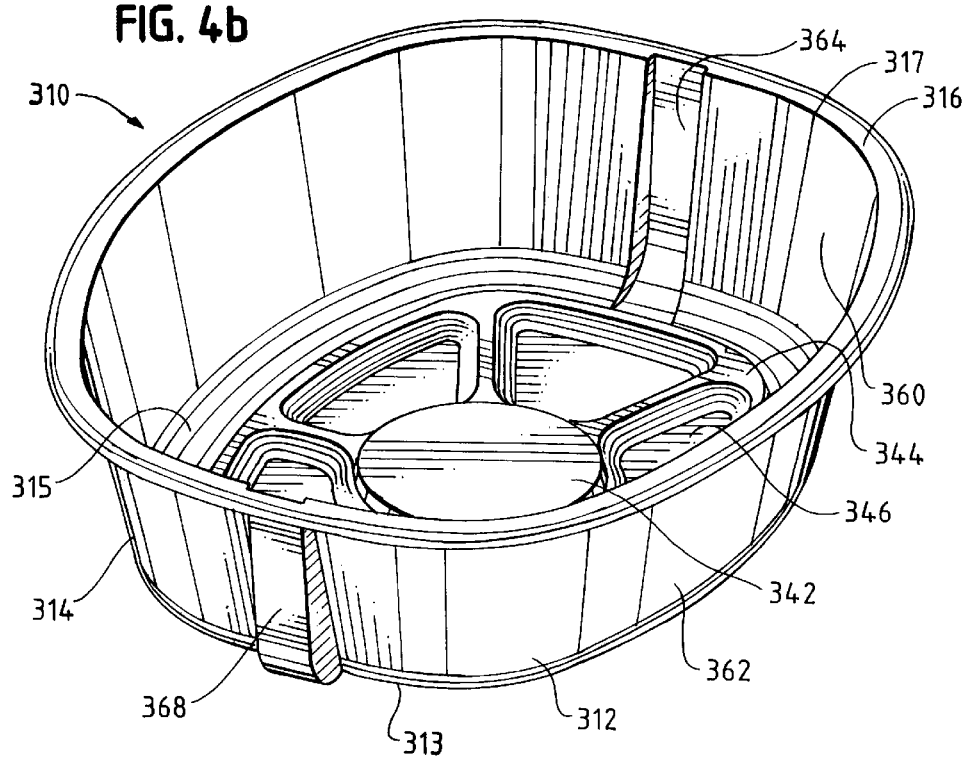

A third embodiment of the interchangeable roasting pan/cover of the present invention is indicated generally at 310 in FIGS. 4A and 4B. As with the embodiments described above, pan/cover 310 features a base panel 312 with a perimeter 313. A side wall 314 surrounds the perimeter 313 of base panel 312 so as to define a circumferential channel 315. Circumferential channel 315 increases the structural strength of pan/cover 310 and is sized to receive an abundance of juice and grease from the food product. As a result of the latter, juice and grease are kept away from the food product so that excessive fat is not absorbed.

A rim 316 is disposed about the outer edge 317 of side wall 314. As with the previously described embodiments, a pair of pan/covers 310 may be placed with their rims 316 abutted (in the manner shown in FIG. 2) so that the top pan/cover serves as a cover and the bottom pan/cover serves as a pan supporting the food product. Alternatively, the two pan/covers 310 may be placed one inside of the other in a nested configuration for compact storage.

As shown in FIG. 4B, a platform 342 is formed on the interior surface of base panel 312. Platform 342 elevates the food product away from the juices and grease and promotes uniform cooking and browning. Additional platforms 344 are also formed on the interior surface of base panel 312 and define recesses 346 that receive juices and grease from the food product. As with the previously described embodiments, platforms 342 and 344 also improve the structural strength of base panel 312.

Side wall 314 features an interior surface 360 and an exterior surface 362. A pair of side wall recesses 364 are formed in opposing portions of interior surface 360 so as to increase the structural strength of side wall 314 and define a pair of handles 368 on exterior surface 362. Side wall recesses 364 preferably extend between rim 316 and circumferential channel 315. This arrangement allows rim 316, circumferential channel 315 and side wall recesses 364 to cooperate so as to form a sort of "framework" for pan/cover 310. This framework provides pan/cover 310 with greatly enhanced structural strength when pan/cover 310 is used as a pan.

While the preferred embodiments of the invention have been shown and described, it will be apparent to those skilled in the art that changes and modifications may be made therein without departing from the spirit of the invention, the scope of which is defined by the appended claims.

What is claimed is:

1. An interchangeable pan/cover for roasting a food product comprising:
   a) a base panel having a perimeter, an exterior surface, and an interior surface;
   b) a handle recess formed in the base panel, said handle recess defining a handle upon the exterior surface of said base panel and a platform for supporting the food product on the interior surface of said base panel;
   c) a side wall having an outer edge, said side wall disposed about the perimeter of said base panel; and
   d) a rim disposed about the outer edge of the side wall;
   whereby a pair of said interchangeable pan/covers may be oriented with their rims abutted so that one of the pair of interchangeable pan/covers may serve as a cover for the other one of the pair of interchangeable pan/covers acting as a pan.

2. The interchangeable pan/cover of claim 1 further comprising an even-numbered plurality of tongue and groove features formed upon said rim in a staggered arrangement so that when a pair of said interchangeable pan/covers are oriented with their rims abutted, the tongue and groove features of the pair of said interchangeable pan/covers engage each other.

3. The interchangeable pan/cover of claim 1 wherein said base panel, side wall, and rim are formed from a single sheet of a disposable material.

4. The interchangeable pan/cover of claim 3 wherein said disposable material is aluminum foil.

5. The interchangeable pan/cover of claim 1 wherein said platform defines a recess in the interior surface of said base panel for receiving juice and grease from said food product.

6. The interchangeable pan/cover of claim 1 further comprising an additional platform formed upon the interior surface of said base panel, said additional platform supporting the food product and defining a recess for receiving grease and juice from the food product.

7. An interchangeable pan/cover for roasting a food product comprising:
   a) a base panel having a perimeter and a platform for supporting the food product;
   b) a side wall having an interior surface, an exterior surface, and an outer edge, said side wall disposed about the perimeter of said base panel;
   c) a side wall recess formed in the interior surface of said side wall, said side wall recess enhancing said side wall's structural strength and defining a handle on the exterior surface thereof; and
   d) a rim disposed about the outer edge of said side wall;
   whereby a pair of said interchangeable pan/covers may be oriented with their rims abutted so that one of the pair of interchangeable pan/covers may serve as a cover for the other one of the pair of interchangeable pan/covers acting as a pan.

8. The interchangeable pan/cover of claim 7 further comprising an even-numbered plurality of tongue and groove features formed upon said rim in a staggered arrangement so that when a pair of said interchangeable pan/covers are oriented with their rims abutted, the tongue and groove features of the pair of said interchangeable pan/covers engage each other.

9. The interchangeable pan/cover of claim 7 wherein the perimeter of said base panel and said side wall define a circumferential channel for receiving juice and grease from the food product.

10. The interchangeable pan/cover of claim 9 wherein said side wall recess extends between said rim and said circumferential channel so that the pan/cover's structural strength is enhanced.

11. The interchangeable pan/cover of claim 7 wherein said base panel, side wall, and rim are formed from a single sheet of a disposable material.

12. The interchangeable pan/cover of claim 11 wherein said disposable material is aluminum foil.

13. The interchangeable pan/cover of claim 7 further comprising an additional platform formed in said base panel, said additional platform supporting the food product and defining a recess for receiving grease and juice from the food product.

14. An interchangeable pan/cover for roasting a food product comprising:
   a) a base panel having a perimeter and a platform for supporting the food product;
   b) a side wall having an interior surface, an exterior surface, and an outer edge, said side wall disposed about the perimeter of said base panel so as to define a circumferential channel;
   c) a rim disposed about the outer edge of the side wall; and
   d) a pair of side wall recesses formed in opposing portions of the interior surface of said side wall and extending between said rim and said circumferential channel so as to enhance the pan/cover's structural strength and define a pair of handles on the exterior surface of said side wall;
   whereby a pair of said interchangeable pan/covers may be oriented with their rims abutted so that one of the pair of interchangeable pan/covers may serve as a cover for the other one of the pair of interchangeable pan/covers acting as a pan.

15. The interchangeable pan/cover of claim 14 further comprising an even-numbered plurality of tongue and groove features formed upon said rim in a staggered arrangement so that when a pair of said interchangeable pan/covers are oriented with their rims abutted, the tongue and groove features of the pair of said interchangeable pan/covers engage each other.

16. The interchangeable pan/cover of claim 14 wherein said base panel, side wall, and rim are formed from a single sheet of a disposable material.

17. The interchangeable pan/cover of claim 16 wherein said disposable material is aluminum foil.

18. The interchangeable pan/cover of claim 14 further comprising an additional platform formed in said base panel, said additional platform supporting the food product and defining a recess for receiving grease and juice from the food product.

* * * * *